(12) United States Patent
Moreland

(10) Patent No.: US 7,441,377 B1
(45) Date of Patent: Oct. 28, 2008

(54) HEAT DISSIPATING BEAM

(76) Inventor: Kenneth L. Moreland, 4866 Moravian Church Rd. SE., New Philadelphia, OH (US) 44663

( * ) Notice: Subject to any disclaimer, the term of this patent is extended or adjusted under 35 U.S.C. 154(b) by 75 days.

(21) Appl. No.: 10/441,295

(22) Filed: May 15, 2003

(51) Int. Cl.
*E04B 1/92* (2006.01)
*E04C 2/00* (2006.01)

(52) U.S. Cl. ............................. 52/168; 52/232; 52/234; 52/220.1; 239/209

(58) Field of Classification Search .................. 52/168, 52/218, 655.1, 404.1, 232, 737.4, 220.1, 52/302.1; 169/16, 39, 54, 57; 239/209, 208; 248/61–65
See application file for complete search history.

(56) References Cited

U.S. PATENT DOCUMENTS

| | | | | |
|---|---|---|---|---|
| 3,464,172 A | * | 9/1969 | McGee, Jr. ................... | 52/168 |
| 3,616,583 A | * | 11/1971 | Weineck et al. ............... | 52/168 |
| 3,939,914 A | * | 2/1976 | Carroll ........................ | 169/16 |
| 4,012,875 A | * | 3/1977 | Hirsch ......................... | 52/168 |
| 4,019,581 A | * | 4/1977 | Diggs .......................... | 169/16 |
| 4,584,811 A | * | 4/1986 | Balinski ....................... | 52/714 |
| 5,060,716 A | * | 10/1991 | Heine .......................... | 165/47 |
| 5,493,820 A | * | 2/1996 | Joseph ......................... | 52/168 |
| 5,580,648 A | * | 12/1996 | Castle et al. .................. | 442/21 |
| 6,718,702 B2 | * | 4/2004 | Fuerle ......................... | 52/168 |
| 6,763,645 B2 | * | 7/2004 | Hunter ......................... | 52/633 |
| 7,310,920 B2 | * | 12/2007 | Hovey, Jr. .................... | 52/655.1 |

* cited by examiner

*Primary Examiner*—J. Allen Shriver
*Assistant Examiner*—Tan Le

(57) ABSTRACT

The heat dissipating beam is an I-beam with heavy-duty conduits placed in the upper left and lower right hand corners. These conduits would be clamped in place and would be linked together via suitable fittings when the beams are structurally arranged. The conduits would be tied into a common riser to a roof-mounted water storage tank, which would hold water or another fluid with heat dissipation qualities. A pump would also be attached to the water tank for replacing the fluid after a fire or similar incident in which deployment of the fluid into the beams would be necessary. When the conduits are filled with water, or another suitable liquid, the beam would be able to withstand exposure to a greater degree of heat before weakening and failing.

10 Claims, 4 Drawing Sheets

HEAT DISSIPATING BEAM

BACKGROUND OF THE INVENTION

1. Field of the Invention

The present invention relates to a heat dissipating beam for use in connection with constructing multi-story commercial buildings and especially with protecting such buildings against fire. The heat dissipating beam has particular utility in connection with reducing structure failure due to exposure to fire by providing conduits along the beam and through which water or another suitable fluid would flow to dissipate any heat buildup in the beam.

2. Description of the Prior Art

High rise structures have increasingly come under scrutiny since the World Trade Center collapse in an effort to avoid structural failure due to heat induced weakening. Steel columns extending through several stories of multi-story structures have the high-thermal conductivity necessary to quickly transmit high temperatures from the area in which the fire is present to areas free from fire. As the columns or beams heat up, they are also susceptible to strength failure and can cause the structure to collapse. Therefore, a device which could dissipate a heat build-up in structural beams would provide a first response in combating structural failure during fires, diminishing structural damage and providing an increased amount of time for inhabitants of the building to escape during a fire.

The use of structural components with heat dissipation considerations is known in the prior art. For example, U.S. Pat. No. 273,556 to Samuel Liddle discloses a fire-proof structure that consists of a building constructed of metal plates attached to both sides of perforated iron posts and beams and forming a hollow shell wherein the shell can be filled with water from a reservoir above the building in case of fire. The water can subsequently be drained into a tank situated below the building and pumped back into the reservoir after the fire is over. However, the shell formed around the structure taught by the Liddle '556 patent would not be adequate for dissipating heat in a multi-story building since the internal portion of the structure would not have heat dissipation capabilities. Furthermore, the Liddle '556 patent would require an additional layer of material on each of the outer walls, ceilings, and floors, which would be extremely costly for a large building. Finally, the water reservoir necessary to fill a shell on a multistory building would make the Liddle '556 patent impractical for use with larger structures.

U.S. Pat. No. 4,191,243 to Byron A. Donzis discloses a channel beam having heat transfer fluid disposed within the interior region of the beam that can be connected to the fluid within adjacent beams to form a continuous conduction path beneath a planar surface area. The heat energy incident on the upper surface area of the adjacent beams is transferred to the heat transfer fluid flowing within the beams and can be converted to a more useful form of energy. However, the Donzis '243 device utilizes a channel beam that is suitable for horizontal surfaces and would not be utilized in developing the vertical supports of a multi-story building. Furthermore, since the fluid flows through the interior of the beam in the Donzis '243 device, any cracks or faults in the beam could lead to leakage of the fluid.

Similarly, U.S. Pat. No. 3,893,271 to Joseph C. Kotlarz discloses a basic beam structural member having a unitary, elongated rigid beam with a pair of parallel, opposed channel-shaped portions connected by a pair of spaced walls positioned inwardly from the sides and defining a longitudinally extending slot. The same beam is used as the basis for all structural members, and a metal or plastic rectangular tube is inserted into the slot to provide additional strength and to facilitate interconnection of multiple structural elements. However, the Kotlarz '271 patent does not introduce a heat dissipating liquid into the beam member to aid in prevention of structural failure due to fire. Nor does the Kotlarz '271 patent provide a connective conduit means for continuous flow of such a liquid along connected elements.

U.S. Pat. No. 3,616,583 to Hans Weineck and Gottfried Jacob discloses a column arrangement for multistory structures in which the column is hollow and a coaxial inner duct is provided for introducing water permanently or upon the development of fire into the chamber surrounding the inner duct and enclosed by the outer column. However, the Weineck, et al. '583 patent requires the use of hollow steel columns for the construction of multistory buildings and would not be suitable for use in buildings constructed from steel beams. Additionally, since the duct through which the water passes is located within the column of the Weineck, et al. '583 device, it would be difficult to pinpoint faulty ductwork. Finally, the use of hollow columns in the Weineck, et al. '583 device could affect the overall strength of the structure.

Lastly, U.S. Pat. No. 2,809,074 to James L. McDonald discloses a structural beam used to form floors or ceilings and with an integral conduit sprinkler system that consists of a floor or ceiling joist or truss with a bowed midsection into which a flexible conduit can be inserted for connection to a sprinkler system. However, the McDonald '074 patent requires the conduit to be inserted in the structural element which would be more time consuming and possibly more costly than having it attached externally. Furthermore, finding conduit failures could be more difficult in the McDonald '074 device since they might exist inside a structural element. Finally, the structural elements addressed by the McDonald '074 patent are suitable for use in floors and ceilings but would not be suitable for use in constructing the vertical portion of a multi-story building.

While the above-described devices fulfill their respective, particular objectives and requirements, the aforementioned patents do not describe a heat dissipating beam that provides conduits along the external surface of the beam through which water or another suitable fluid would flow to dissipate any heat buildup in the beam. The Donzis '243 and McDonald '074 patents address structural elements suitable for use in floors and ceilings that would not be used in constructing the vertical portion of a multi-story building, while the Weineck, et al. '583 patent addresses hollow steel columns that would not be suitable for the construction of many multi-story buildings. Furthermore, use of hollow columns in the Weineck, et al. '583 device could affect the overall strength of the structure. Additionally, the Donzis '243, Weineck, et al. '583, and the McDonald '074 devices provide conduit means in the interior of the structural element, which increases the difficulty in locating and fixing conduit failures. Moreover, the McDonald '074 patent requires the conduit to be inserted in the structural element which would be more time consuming and possibly more costly than having it attached externally. The shell formed around the structure taught by the Liddle '556 patent would not be adequate for dissipating heat in a multi-story building since the internal portion of the structure would not have heat dissipation capabilities, and it would require an additional layer of material on each of the outer walls, ceilings, and floors, which would be extremely costly for a large building. In addition, it would be impractical to implement the Liddle '556 patent in a large structure since the water reservoir necessary to fill the shell would be exceedingly large. Finally, the Kotlarz '271 patent fails to introduce a heat dissipating liquid into the beam member and fails to provide a conduit means for passing such a liquid along connected beam members.

Therefore, a need exists for a new and improved heat dissipating beam that can be used for reducing structure failure due to exposure to fire by providing conduits along the external surface of the beam through which water or another suitable fluid would flow to dissipate any heat buildup in the beam. In this regard, the present invention substantially fulfills this need. In this respect, the heat dissipating beam according to the present invention substantially departs from the conventional concepts and designs of the prior art, and in doing so provides an apparatus primarily developed for the purpose of reducing structural failure of multi-story buildings due to heat buildup along the structural elements due to exposure to fire.

SUMMARY OF THE INVENTION

In view of the foregoing disadvantages inherent in the known types of structural components with heat dissipation considerations now present in the prior art, the present invention provides an improved heat dissipating beam, and overcomes the above-mentioned disadvantages and drawbacks of the prior art. As such, the general purpose of the present invention, which will be described subsequently in greater detail, is to provide a new and improved heat dissipating beam and method which has all the advantages of the prior art mentioned heretofore and many novel features that result in a heat dissipating beam which is not anticipated, rendered obvious, suggested, or even implied by the prior art, either alone or in any combination thereof.

To attain this, the present invention essentially comprises a structural I-beam having a pair of specifically configured conduits running the length of the beam and attached to opposite inner corners of the web of the beam.

A second embodiment of the invention provides a pair of internal slots running the length of a structural I-beam and operating as conduits for fluid passage through the beam.

There has thus been outlined, rather broadly, the more important features of the invention in order that the detailed description thereof that follows may be better understood and in order that the present contribution to the art may be better appreciated.

The invention may also include a water tank with shut-off valve located at the top of a building constructed of the beams and connected to the conduits for the purpose of providing heat dissipation capabilities to the skeleton of the building. A pump is connected to the return conduits and the tank to refill the tank after the fluid from the water tank is deployed in the conduits. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved heat dissipating beam that has all of the advantages of the prior art structural components with heat dissipation considerations and none of the disadvantages.

It is another object of the present invention to provide a new and improved heat dissipating beam that may be easily and efficiently manufactured and marketed.

An even further object of the present invention is to provide a new and improved heat dissipating beam that has a low cost of manufacture with regard to both materials and labor, and which accordingly is then susceptible of low prices of sale to the consuming public, thereby making such a heat dissipating beam economically available to the buying public.

Still another object of the present invention is to provide a new heat dissipating beam that provides in the apparatuses and methods of the prior art some of the advantages thereof, while simultaneously overcoming some of the disadvantages normally associated therewith.

Even still another object of the present invention is to provide a heat dissipating beam for providing temperature control to the skeleton of a building made with the beams. This allows the structure of the building to absorb more heat before weakening and failing due to exposure to fire or other high heat situations.

Yet another object of the present invention is to provide a heat dissipation beam that places fluid conduits on the external surface of the beam. This allows the user to quickly pinpoint and easily fix any leaks in the conduits.

Still yet another object of the present invention is to provide a heat dissipation beam that takes the form of commonly used structural element. This allows the improved safety of buildings constructed of such structural elements without changing designs because of specialty beams.

Lastly, it is an object of the present invention to provide a new and improved heat dissipation system for buildings that provides conduits along the skeleton of the structure and through which water or another suitable fluid would flow to dissipate any heat buildup in the beam. This increases the safety of the building, reducing the ability of the beams to transmit heat along their length and increasing the amount of time for building inhabitants to escape the building before any structural collapse.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
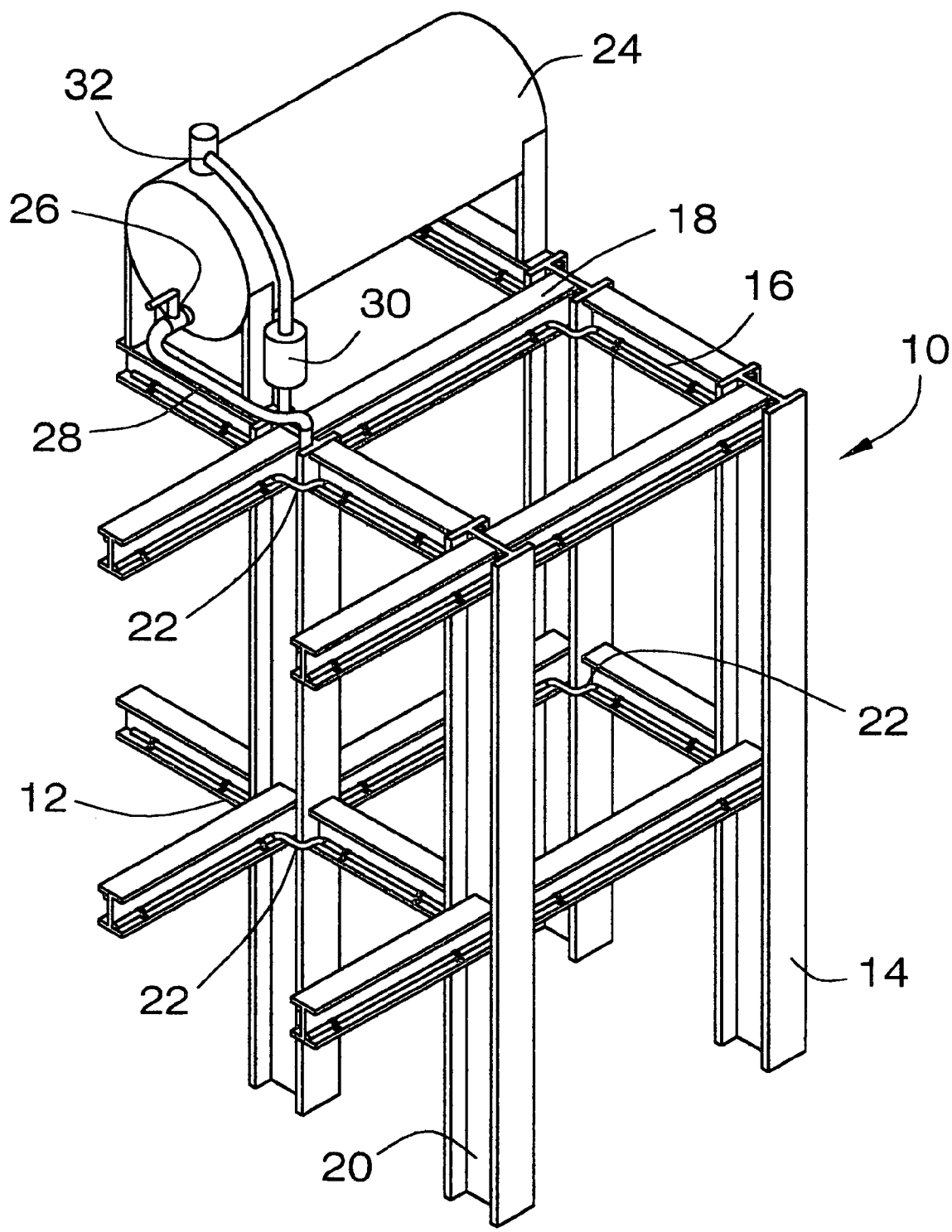
FIG. 1 is a front perspective view of the preferred embodiment of the heat dissipating beam constructed in accordance with the principles of the present invention and shown utilized in a multi-story structure.
Figure 2:
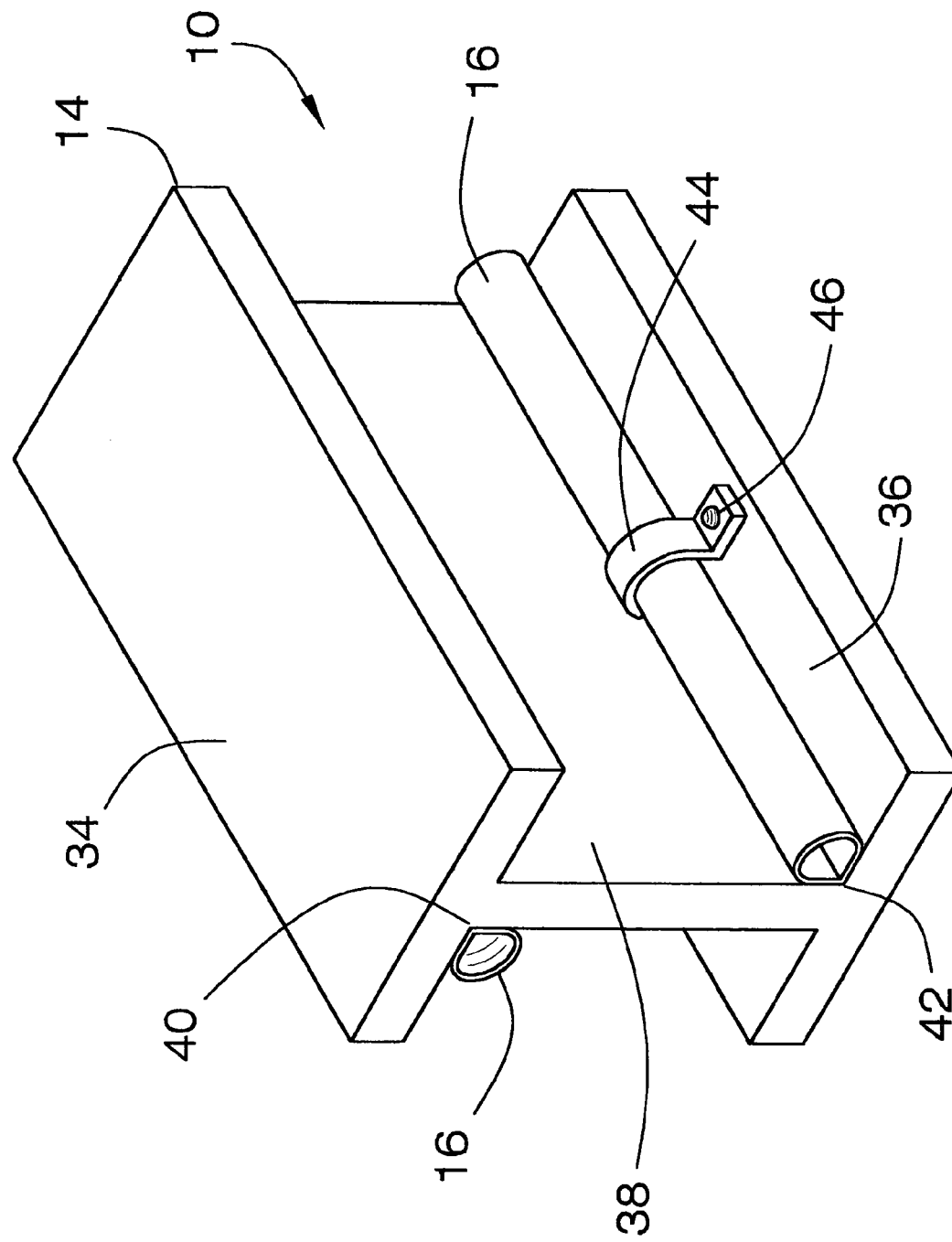
FIG. 2 is a right side perspective view of the heat dissipating beam of the present invention with square corners.
Figure 3:
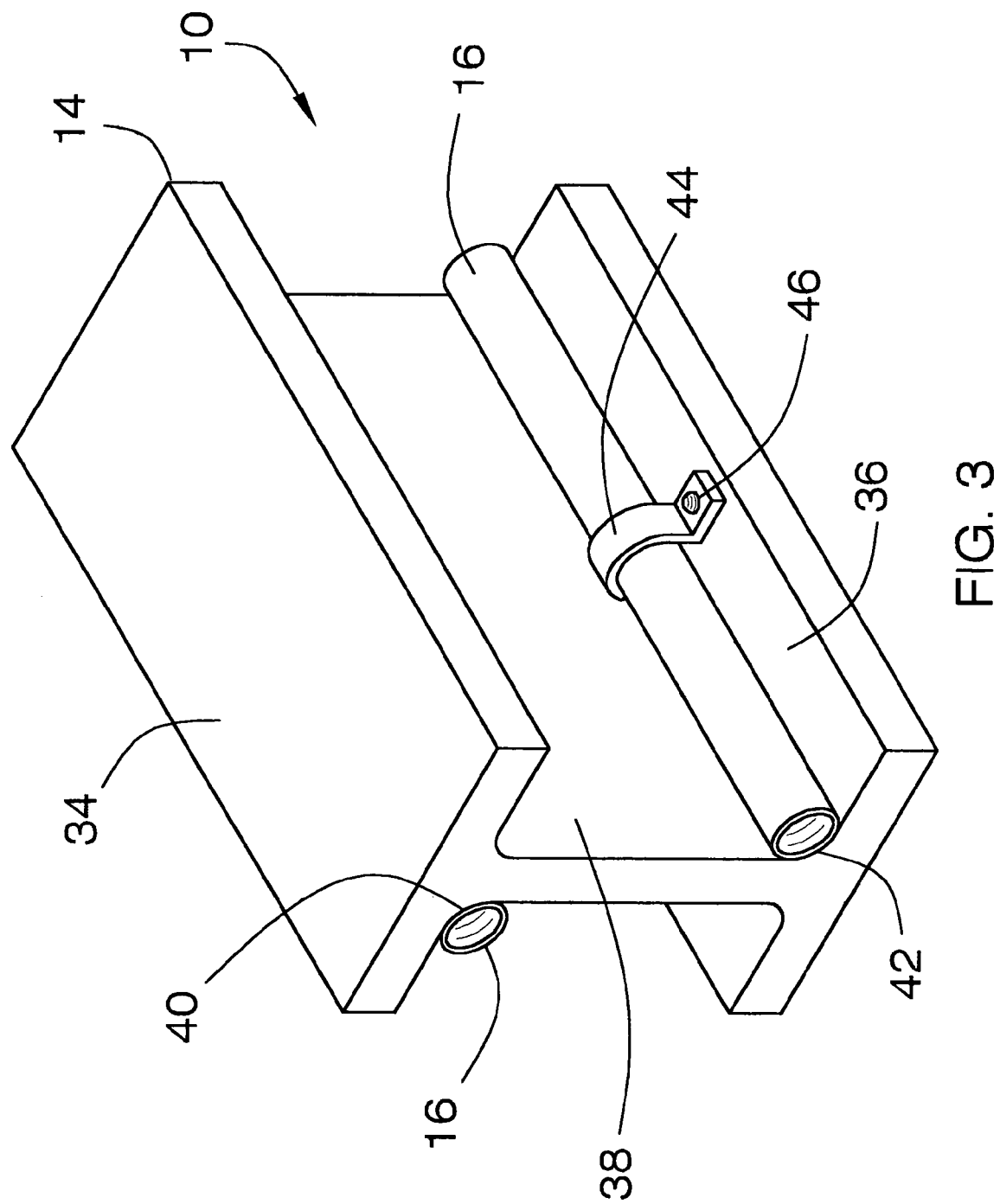
FIG. 3 is a right side perspective view of the heat dissipating beam of the present invention with rounded corners.

Referring now to the drawings, and particularly to FIGS. 1-3, a preferred embodiment of the heat dissipating beam of the present invention is shown and generally designated by the reference numeral 10.

In FIG. 1, a new and improved heat dissipating beam 10 of the present invention for reducing structure failure due to exposure to fire by providing conduits along the external surface of the beam through which water or another suitable fluid would flow to dissipate any heat buildup in the beam is illustrated and will be described. More particularly, a plurality of heat dissipating beams 10 is shown interconnected to form a multi-story structure 12. Each heat dissipating beam 10 consists of an I-beam 14 with a conduit 16 attached to its external surface. The conduits 16, formed of heavy-duty copper pipes, are secured to the beams 10 and are shown configured along both the horizontal and vertical supports, 18 and 20 respectively, of the structure; however, the conduits 16 on the vertical supports 20 are not visible from the angle of this figure. The conduits 16 are joined by connectors 22 to allow for continuous fluid flow along both the horizontal and vertical supports, 18 and 20. Water, or another fluid with suitable heat dissipation qualities, is inserted into the conduits 16 by a tank 24 located at the top of the structure 12. The tank 24 would feature a shut-off valve 26 and an outlet tube 28 connected to a conduit 16 on one of the vertical supports 20. The water would then flow through each of the conduits 16 and would be returned to the tank 24 via a conduit 16 which is connected to a pump 30 feeding an inlet port 32 to the tank 22.

FIGS. 2 and 3 show a right perspective view of the heat dissipating beam 10. The beam consists of an I-beam 14 with an upper horizontal member 34, a lower horizontal member 36 and a vertical member 38 perpendicularly connecting the centers of the upper and lower horizontal members, 34 and 36. The I-beam 14 has a conduit 16 at both the upper left and lower right corners, 40 and 42. The conduits 16 of FIG. 2 are formed with a square corner along one edge to ensure a secure fit in the corner of the I-beam 14. Alternatively, the corners of the I-beam 14 are curved in FIG. 3 to ensure a secure fit for the conduits 16. In either case, the conduits 16 are connected to the I-beam 14 with a clamp 44 secured to the respective upper or lower horizontal member, 34 or 36, by a rivet 46.

Figure 4:
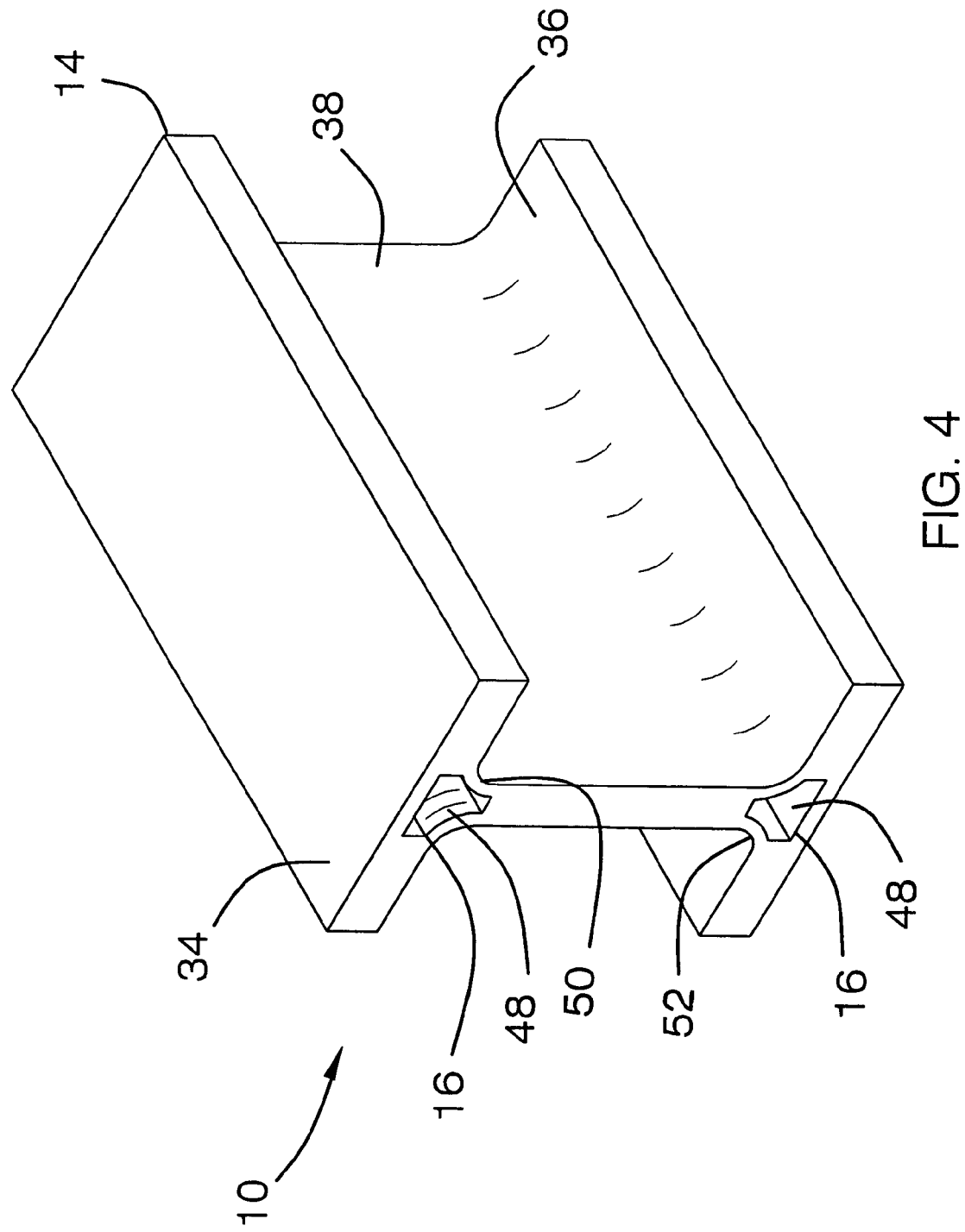
FIG. 4 is a right side perspective view of a second embodiment of the heat dissipating beam of the present invention.

FIG. 4 shows a second embodiment of the heat dissipating beam 10 in which the fluid conduit 16 is incorporated into an internal slot 48 formed at the upper and lower junctures, 50 and 52, of the vertical member 38 with the upper and lower horizontal members, 34 and 36. As in the first embodiment, the beams would be joined together, allowing a continuous fluid flow through a structure built with these beams 14.

In use, it can now be understood that a structure would be built with the heat dissipating beams wherein the conduits are connected to form a continuous path in which fluid is capable of flowing. The conduits would be connected to a water tank placed at the top of the structure. If fire or intense heat were present in or threatened the structure, the shut-off valve would be opened, and water would flow through the continuous conduit. This would increase the amount of heat the beams could absorb before weakening and failing due to exposure to extreme heat. The water could be pumped back into the storage tank once the emergency had passed. In addition, the shut-off valve of the tank could be employed if a leak were detected in any of the conduits.

While a preferred embodiment of the heat dissipating beam has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, the I-beams could be produced in a range of cross-sections and lengths. Also, the conduits may be made of heavy-duty copper, rubber, PVC, or similar material suitable for water pipes.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A heat dissipation system for buildings comprising:
a plurality of I-beams having an elongated, rectangular upper horizontal support having a top surface, a bottom surface, a first side, a center, and a second side; an elongated, rectangular vertical support having a right side, a left side parallel to said right side, a top edge, a center, and a bottom edge and perpendicularly connected on said top edge to said center of said bottom surface of said upper horizontal support wherein an upper right corner is formed on said right side of said vertical support and an upper left corner is formed on said left side of said vertical support; and an elongated rectangular lower horizontal support having a top surface, a bottom surface, a first side, a center, and a second side and perpendicularly connected along said center of said top surface to said bottom edge of said vertical support wherein a lower right corner is formed on said right side of said vertical support and a lower left corner is formed on said left side of said vertical support;
a plurality of elongated conduits capable of containing a liquid with heat transfer capabilities and connected to said I-beams wherein a different said conduit is connected along the length of said right side of each said vertical support of said plurality of I-beams and a different said conduit is connected along the length of said left side of each said vertical support of said plurality of I-beams;
a plurality of clamps connected to said plurality of conduits;
a plurality of connectors having a first side, a second side, and a hollow passageway between said first and said second sides and connected to said plurality of conduits wherein said connectors join said conduits together when said plurality of I-beams are structurally arranged;

a pump connected to one of said plurality of conduits;

a water inlet hose connected to said pump;

a water tank connected to said water inlet hose;

a plurality of tank supports connected to said plurality of I-beams when said plurality of I-beams are structurally arranged and connected to said water tank;

a valve having an open and a closed position and connected to said tank; and a water outlet hose connected to said valve and to one of said plurality of conduits.

2. The heat dissipation system for buildings of claim 1 wherein said water tank is located above said plurality of I-beams.

3. The heat dissipation system for buildings of claim 1 wherein said plurality of conduits connected along the length of said right side of each said vertical support of said plurality of I-beams are placed along said lower right corners formed between said right sides of said vertical supports and said lower horizontal supports.

4. The heat dissipation system for buildings of claim 3 wherein said plurality of conduits connected along the length of said left side of each said vertical support of said plurality of I-beams are placed along said upper left corners formed between said left sides of said vertical supports and said upper horizontal supports.

5. The heat dissipation system for buildings of claim 4 wherein said plurality of conduits are formed with a cylindrical first longitudinal half and a second longitudinal half formed in a corner to fit said upper left and said lower right corners of said plurality of I-beams.

6. The heat dissipation system for buildings of claim 4 wherein said plurality of conduits is cylindrical and said upper left corner and said lower right corners of said plurality of I-beams are rounded to accept said plurality of conduits.

7. The heat dissipation system for buildings of claim 1 wherein said plurality of clamps is riveted to said upper horizontal supports and said lower horizontal supports, respectively, of said plurality of I-beams wherein one said conduit is connected to said upper left corner of each said I-beam and a different said conduit is connected to said lower right corner of each said I-beam.

8. The heat dissipation system for buildings of claim 1 wherein fluid stored in said water tank flows into said water outlet hose and subsequently into said plurality of conduits when said valve is placed in said open position.

9. The heat dissipation system for buildings of claim 1 wherein fluid present in said plurality of conduits is returned to said water tank by said pump.

10. The heat dissipation system for buildings of claim 1 wherein said water tank contains water or some other fluid with heat dissipation qualities.

\* \* \* \* \*